United States Patent
Klipper et al.

(10) Patent No.: US 7,265,159 B2
(45) Date of Patent: Sep. 4, 2007

(54) MONODISPERSE ANION EXCHANGERS

(75) Inventors: Reinhold Klipper, Köln (DE); Olaf Halle, Köln (DE); Claudia Schmid, Leichlingen (DE); Wolfgang Podszun, Köln (DE); Rüdiger Seidel, Leverkusen (DE); Hans-Karl Soest, Köln (DE)

(73) Assignee: Bayer Aktiengesellschaft, Leverkusen (DE)

( * ) Notice: Subject to any disclaimer, the term of this patent is extended or adjusted under 35 U.S.C. 154(b) by 369 days.

(21) Appl. No.: 10/896,460

(22) Filed: Jul. 22, 2004

(65) Prior Publication Data

US 2005/0004240 A1 Jan. 6, 2005

Related U.S. Application Data

(62) Division of application No. 10/299,299, filed on Nov. 19, 2002, now abandoned.

(30) Foreign Application Priority Data

Dec. 17, 2001 (DE) ................. 101 61 979

(51) Int. Cl.
C08J 5/20 (2006.01)
B01J 39/20 (2006.01)
B01J 41/14 (2006.01)

(52) U.S. Cl. ............... 521/31; 521/25; 521/30; 521/32; 521/33; 521/38; 526/79; 526/80; 526/87; 526/218.1; 526/227; 526/336; 526/342; 526/347

(58) Field of Classification Search ......... 521/25, 521/30, 31, 32, 33, 38; 526/79, 80, 87, 218.1, 526/227, 336, 342, 347

See application file for complete search history.

(56) References Cited

U.S. PATENT DOCUMENTS

| 2,675,359 | A |   | 4/1954  | Schneider |
|-----------|---|---|---------|-----------|
| 3,716,482 | A |   | 2/1973  | Corte et al. |
| 4,082,701 | A |   | 4/1978  | Fries et al. |
| 4,382,124 | A |   | 5/1983  | Meitzner et al. |
| 4,427,294 | A |   | 1/1984  | Nardo |
| 4,427,794 | A | * | 1/1984  | Lange et al. ............. 521/38 |
| 4,564,644 | A | * | 1/1986  | Harris ...................... 521/28 |
| 5,021,253 | A |   | 6/1991  | Dawson-Ekeland et al. |
| 5,414,020 | A |   | 5/1995  | Heller et al. |
| 5,441,646 | A |   | 8/1995  | Heller et al. |
| 5,834,524 | A |   | 11/1998 | Bloodworth et al. |
| 6,329,435 | B1|   | 12/2001 | Klipper et al. |
| 6,365,683 | B2|   | 4/2002  | Podszun et al. |

FOREIGN PATENT DOCUMENTS

| CA | 2 316 667    | 2/2001  |
| CZ | 169 356      | 5/1997  |
| DE | 99 587       | 10/1972 |
| DE | 100 61 544 A1| 6/2002  |
| EP | 0046 535     | 3/1982  |
| EP | 0 464 458 A1 | 1/1992  |
| EP | 0 532 894 A1 | 3/1993  |
| EP | 1 078 688 A2 | 2/2001  |

OTHER PUBLICATIONS

Josef Seidl et al. "Aminolyza koplymeru etylakrylatu s divinylbenzenem alifatickynu aminy", Chemicky Prumysl, roc. 29/54 (1979), cis 9, 470.

* cited by examiner

Primary Examiner—Helen L Pezzuto
(74) Attorney, Agent, or Firm—Norris McLaughlin & Marcus PA

(57) ABSTRACT

Process for preparing monodisperse weakly basic or optionally strongly basic anion exchangers of the poly(meth)acrylamide type, the ion exchangers themselves and their use.

18 Claims, No Drawings

MONODISPERSE ANION EXCHANGERS

CROSS REFERENCE TO RELATED APPLICATION

This application is a divisional application of U.S. Ser. No. 10/299,299, filed Nov. 19, 2002, now abandoned.

The present invention relates to a process for preparing monodisperse weakly basic, and optionally monodisperse strongly basic, anion exchangers of the poly(meth)acrylamide type, and to uses thereof.

Monodisperse anion exchangers of the poly(meth)acrylamide type according to the present invention are anion exchangers starting from either monovinyl aromatic compounds or acrylic compounds which are copolymerized with further acrylic compounds, and then reacted with amines of the diamine-type and functionalized with alkylhalides or arylhalides.

BACKGROUND OF THE INVENTION

From the prior art, heterodisperse anion exchangers of the poly(meth)acrylamide type are already known. These are a class of anion exchangers which can be used in practice for numerous different applications.

An important area of use of heterodisperse anion exchangers of the poly(meth)acrylamide type is water treatment technology, in which it is possible to remove anions, for example, chloride, sulphate or nitrate, and weak acids such as salicylic acid and carbonic acid; organic acids such as formic acid, acetic acid, citric acid, humic acids and others.

Currently, both gel-type and macroporous heterodisperse anion exchangers of the poly(meth)acrylamide type are used in decolorizing press juices from beets and sugar cane. In the course of the complex production process of sugar extraction, the press juices from the beets, preferably sugar beets, and the sugar cane discolor. Pigments, for example melanoidines and caramel colors are formed. U.S. Pat. No. 4,082,701 discloses the use heterodisperse anion exchangers of the poly(meth)acrylamide type, for decolorizing pigment solutions. Raw solutions of liquid sugar syrup or invert sugar syrup are also currently desalted using heterodisperse anion exchangers of the poly(meth)acrylamide type.

It is also known to use gel-type or macroporous heterodisperse anion exchangers of the poly(meth)acrylamide type for the removal of acids or acidic components from whey and fruit thin press juices.

A known process for preparing heterodisperse anion exchangers of the poly(meth)acrylamide type is aminolysis of crosslinked acrylic ester bead polymers with polyamines according to U.S. Pat. No. 2,675,359, CZ-A 169 356, DD 99 587 or U.S. Pat. No. 5,414,020.

The crosslinked (meth)acrylic ester resin bead polymers used for the aminolysis are prepared in the prior art as gel-type or macroporous resins. They are prepared in mixed polymerization by the suspension polymerization process. This produces heterodisperse bead polymers having a broad particle size distribution in the range from approximately 0.2 mm to approximately 1.2 mm.

The heterodisperse anion exchangers of the poly(meth)acrylamide type obtained after the subsequent aminolysis can be quaternized by alkylating agents. The reaction to be performed here to give strongly basic groups can be carried out in the range from 1 to 100%, that is to say completely. Customary alkylating agents are alkyl halides or aryl halides or mixtures of the two, for example chloromethane according to U.S. Pat. No. 4,082,701 or benzyl chloride.

In U.S. Pat. No. 2,675,359, gel-type and macroporous heterodisperse bead polymers based on a methylacrylate-divinylbenzene copolymer are reacted with diethylenetriamine.

DD 99 587 describes the preparation of solid-grain weakly basic heterodisperse anion exchangers based on polyacrylic esters. The grain solidity is achieved by means of the fact that, after the copolymer is reacted with the polyamine, the resin is treated with a water-miscible solvent which swells the resin to a lesser extent than water.

Suitable solvents used are, for example, methanol, ethanol, acetone or mixtures thereof. 99% of the beads are obtained without cracks or fissures.

Without the treatment with methanol, for example, 35% of the beads have cracks and fissures.

The heterodisperse anion exchangers of the poly(meth)acrylamide type, depending on the charged form of the resin, that is to say depending on the type of counter ion to the nitrogen, exhibit differing resin volumes. When converted from the chloride form to the free base form, the resin swells markedly. Conversely, it shrinks on conversion from the free base form to the chloride form. In the industrial use of these heterodisperse anion exchangers of the poly(meth)acrylamide type, therefore, charging and regeneration is associated in each case with shrinkage or swelling, respectively. In the course of long-term use, however, these heterodisperse anion exchangers are regenerated several hundred times. The shrinking and swelling operations occurring in the course of this stress the bead stability so greatly that a fraction of the beads develop cracks, finally even fracturing. Fragments are produced which lead to blockages in the service apparatus and the columns, and impede flow, which in turn leads to an increased pressure drop. In addition, the fragments contaminate the medium being treated, preferably water, and thus reduce the quality of the medium or the water.

The flow of water through a column packed with beads, however, is impeded not only by resin fragments, but also by fine polymer beads, if present. An increase in pressure drop occurs. Due to the particle size distribution of known heterodisperse anion exchangers of the poly(meth)acrylamide type, beads of differing diameters are present. The presence of such fine beads additionally increases the pressure drop.

Seidl et al., Chemicky prumysl, roc. 29/54 (1979) cis 9,470, studied the aminolysis reaction of crosslinked acrylic ester resins and found that, in addition to the acrylamide unit, free acrylic acid units are also formed. All acrylamide resins exhibit free acrylic acid units.

After completion of charging of heterodisperse anion exchangers of the poly(meth)acrylamide type with anions, therefore, the resin is regenerated with dilute sodium hydroxide solution in order to prepare it for new charging. Sodium hydroxide solution residues are washed out of the resin with water. In addition the carboxylate ion which results from treating the carboxylic acid group with sodium hydroxide solution is hydrolysed by the water washing. During production of the resins a low conductivity of the effluent water (wash water) from the resin is desired, since otherwise impure water is present. The goal is to achieve low conductivity using small amounts of wash water, since this can be regarded as a sign that only small amounts of weakly acidic groups remain.

SUMMARY OF THE INVENTION

Starting from the prior art, an object of the present invention was to provide not only weakly basic, but also strongly basic, monodisperse anion exchangers of the poly(meth)acrylamide type with high mechanical and osmotic stability of the beads, low pressure drop of the bead bed in use and low wash water consumption and high purity of the monodisperse anion exchanger itself.

In accordance with the present invention, this object, therefore is achieved by a process for preparing monodisperse anion exchangers of the poly(meth)acrylamide type, wherein a) in a first stage a monomer mixture of one or more different acrylic compounds and one or more different crosslinkers or one or more different monovinyl aromatic compounds and one or more different crosslinkers are injected or sprayed into a liquid essentially immiscible with the monomer mixture to form droplets, the droplets are then encapsulated and polymerized, and the encapsulated and polymerized droplets are then reacted with a feed of acrylic compounds and crosslinkers in a seed-feed process and the resulting product is polymerized to form monodisperse crosslinked acrylic polymer beads or monodisperse crosslinked acryl-containing polymer beads, and b) in a second stage the monodisperse crosslinked acrylic polymer beads or acryl-containing polymer beads (when starting from monovinyl aromatic compounds) obtained from the first stage are introduced into a liquid amine of the diamine type to form a suspension, the suspension is heated to temperatures above 100° C., optionally distilled, stirred for several hours, and the resulting aminated bead polymer is washed amine-free.

In case that the monomer mixture of step a) contains acrylic compounds, a feed of the same acrylic compounds is preferred.

Alternatively the process can be started from one or more different acrylic compounds and one or more different crosslinkers without using a feed in step a) and the droplets formed are then encapsulated and polymerized and the polymerized droplets are then reacted according to step b). In this case the object of the present invention is achieved by a process for preparing monodisperse anion exchangers of the poly(meth)acrylamide type, wherein a) in a first stage a monomer mixture of one or more different acrylic compounds and one or more different crosslinkers is injected into a liquid essentially immiscible with the monomer mixture to form droplets, the droplets are then encapsulated and polymerized, b) and the product obtained by step a) is introduced into a liquid amine of the diamine type to form a suspension, the suspension is heated to temperatures of from 160° C. to 210° C., optionally distilled, stirred for several hours, and then the resulting aminated bead polymer is washed amine-free.

Optionally, to prepare strongly basic monodisperse anion exchangers of the poly(meth)acrylamide type, there follows a third stage, in which:

c) the aminated bead polymer prepared according to the second stage is partially or completely reacted with alkylhalides or arylhalides to give the corresponding strongly basic monodisperse anion exchangers of the poly(meth)acrylamide type having quaternary amino groups.

In process step a), the polymerization of the encapsulated droplets may be a partial polymerization or a complete polymerization. Those partial or complete polymerizations are described in U.S. Pat. No. 5,068,255 and U.S. Pat. No. 5,834,524, both are hereby incorporated by reference into the present application.

Preferably, methanol is distilled off in the second stage.

The crosslinkers used in the practice of the invention include, for example, polyvinylalkyl compounds, polyvinylaromatic compounds, diene compounds and mixtures thereof.

DETAILED DESCRIPTION

Surprisingly, in the inventive process, complex and expensive treatment of the monodisperse bead polymer with methanol, for example, after the amination, can be dispensed with, and weakly basic or, optionally, strongly basic monodisperse anion exchangers of the poly(meth)acrylamide type are obtained having outstanding osmotic and mechanical stability, low conductivities of the resin effluent water, decreased pressure drop in use and markedly decreased wash water consumption.

The term "monodisperse" as used herein means substances for which at least 90% by volume or by mass of the particles have a diameter which is distributed in the range around the most frequent diameter having a width of ±10% of the most frequent diameter (i.e., the "mode").

For example, for a substance having the most frequent diameter of 0.5 mm (i.e., a distribution with a mode of 0.5 mm), at least 90% by volume or 90% by mass are within a size range between 0.45 mm and 0.55 mm, in the case of a substance having the most frequent diameter of 0.7 mm, at least 90% by volume or 90% by mass are in a size range between 0.63 mm and 0.77 mm.

In principle, in process step a), two different methods can be used. A distinction is made here between direct injection and the seed-feed process.

When direct injection is used in process step a), a monomer mixture comprising one or more different acrylic compounds, preferably (meth)acrylate esters, particularly preferably methyl acrylate or (meth)acrylonitrile, and one or more crosslinkers, for example divinylbenzene or diethylene glycol divinyl ether are injected into a liquid which is essentially immiscible with the monomer mixture resulting in monodisperse droplets, then encapsulated and then the resultant monomer droplets are polymerized.

When the seed-feed process is used in process a), again two variants are possible.

Either the process starts from a monovinyl aromatic compound such as styrene and divinylbenzene as a crosslinker and a monodisperse styrene-divinylbenzene bead polymer is obtained:

In such case for example a monomer mixture of
a) 98.5-99.98% by weight of styrene;
b) 0.01-2% by weight of divinylbenzene; and
c) 0.01-0.05% by weight of ethylstyrene;

injected into a liquid essentially immiscible with the monomer mixture to form droplets, the droplets are then encapsulated and polymerized and the encapsulated and polymerized droplets are then fed with the above-described feed of acrylic compounds and one or more crosslinkers. Monodisperse crosslinked acryl-containing polymer beads are obtained. Other possible monovinyl aromatic compounds are ethylstyrene or substituted styrenes and the substituents can be $C_1$-$C_4$ alkyl or halogen, preferred chlorine.

Or, the bead polymer obtained in accordance with the above-described direct injection process is taken and fed with a feed of acrylic compounds and one or more crosslinkers to give the desired bead polymer with subsequent polymerization.

In all cases it is advisable to keep the monodisperse bead-type crosslinked acrylic polymers as water-free as possible so that these can be used in the subsequent process step b).

The monomer mixture to be used in the first stage a) comprises 1 to 50% by weight, preferably 1 to 25% by weight, particularly preferably 1.5 to 12% by weight, especially preferably 2 to 8% by weight, crosslinker and 50 to 99% by weight, preferably 75 to 99% by weight, particularly preferably 88 to 98.5% by weight, and especially preferably 92 to 98% by weight, acrylic compounds, preferably (meth)acrylic esters or (meth)acrylonitrile. Particularly preferred starting materials are diethyl glycol divinyl ether as crosslinker and methyl acrylate.

The beads prepared according to the seed-feed process are significantly larger than the fine seed beads obtained by the direct spraying process.

Techniques for preparing monodisperse crosslinked bead polymers by the seed-feed process or by the direct spraying process (jetting) are described, for example, in U.S. Pat. No. 4,444,961, U.S. Pat. No. 4,427,794, U.S. Pat. No. 4,419,245, U.S. Pat. No. 5,231,115 or U.S. Pat. No. 4,564,644, the entire contents of which are hereby incorporated by reference into the present application.

In U.S. Pat. No. 4,427,794, the monodisperse crosslinked vinylaromatic bead polymer is prepared in the desired size by injecting (spraying) the monomer mixture into a liquid which is essentially immiscible with the monomer mixture, then encapsulating it and polymerizing the resultant monomer droplets. This method is even used in the present invention.

Preferred (meth)acrylic esters of (meth)acrylonitriles in the context of the present invention are monoethylenically unsaturated compounds, for example alkyl acrylates or alkyl methacrylates, particularly preferably methyl (meth)acrylate, ethyl (meth)acrylate or acrylonitrile.

A (meth)acrylic ester which is particularly preferred in the context of the present invention is methyl acrylate.

Preferred crosslinkers which are used in the context of the present invention in process step a) are multifunctional ethylenically unsaturated compounds such as divinylbenzene, divinyltoluene, trivinylbenzene, divinylnaphthalene, trivinylnaphthalene, 1,7-octadiene, 1,5-hexadiene, diethylene glycol divinyl ether, ethylene glycol dimethacrylate, trimethylpropane trimethacrylate or allyl methacrylate.

The particular type of crosslinker to be used is selected in accordance with the expected use of the polymer beads. Divinylbenzene, for example, is suitable in many cases. For most applications, commercial divinylbenzene quality grades which also comprise ethylvinylbenzene, in addition to the divinylbenzene isomers, are sufficient.

In the event that the starting material is prepared from styrene-divinylbenzene bead polymers by the seed-feed process, the monodisperse bead-type crosslinked acrylic polymer to be used in the inventive process in step b) still contains 0.001 to 8% by weight, preferably 0.0015 to 5% by weight, divinylbenzene.

In a preferred embodiment of the inventive process, microencapsulated acrylic polymers or microencapsulated acryl-containing polymers are used in process step b).

For the preparation of microencapsulated acrylic polymers or microencapsulated acryl-containing polymers for process step b), the materials known for use as complex coacervates are suitable, in particular polyesters, natural or synthetic polyamides, polyurethanes, polyureas.

As a natural polyamide, gelatin, for example, is particularly highly suitable. This is used, in particular, as coacervate or complex coacervate. Gelatin-containing complex coacervates in the context of the invention are taken to mean, especially, combinations of gelatin with synthetic polyelectrolytes. Suitable synthetic polyelectrolytes are copolymers having incorporated units of, for example, maleic acid, acrylic acid, methacrylic acid, acrylamide or methacrylamide. Particularly preferably, acrylic acid or acrylamide is used. Gelatin-containing capsules can be cured using conventional curing agents, for example formaldehyde or glutardialdehyde. The encapsulation of monomer droplets with gelatin, gelatin-containing coacervates and gelatin-containing complex coacervates is described in detail in U.S. Pat. No. 4,427,794. The methods of encapsulation with synthetic polymers are known. A highly suitable method is, for example, phase boundary condensation, in which a reactive component (for example an isocyanate or an acid chloride) which is dissolved in the monomer droplet is brought to reaction with a second reactive component (for example an amine) which is dissolved in the aqueous phase.

The optionally microencapsulated monomer droplets may comprise an initiator or mixtures of initiators to initiate the polymerization. Initiators which are suitable for the inventive process are, for example, peroxy compounds, such as dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexanoate, 2,5-bis(2-ethylhexanoylperoxy)-2,5-dimethylhexane or tert-amylperoxy-2-ethylhexane, and azo compounds, such as 2,2'-azobis (isobutyronitrile) or 2,2'-azobis(2-methylisobutyronitrile).

The initiators are generally used in amounts of 0.05 to 2.5% by weight, preferably 0.1 to 1.5% by weight, based on the monomer mixture.

Further additives which can be used in the optionally microencapsulated monomer droplets are optionally porogens in order to generate a macroporous structure in the bead polymer. Suitable compounds for this are organic solvents which dissolve poorly, or swell, the resultant polymer. Examples which may be mentioned are hexane, octane, isooctane, isododecane, methyl ethyl ketone, butanol or octanol or isomers thereof.

Substances which are suitable porogens are also, especially, organic substances which dissolve in the monomer, but dissolve the polymer poorly, or swell it (precipitant for polymers), for example aliphatic hydrocarbons, as described in German Patent 1 045 102 or German Patent 1 113 570.

The porogen used can, for example, be alcohols having 4 to 10 carbon atoms, such as those described in In U.S. Pat. No. 4,382,124 for producing monodisperse macroporous styrene/divinylbenzene-based bead polymers. This patent also provides a survey of the preparation methods for macroporous bead polymers and is hereby incorporated by reference into the present application.

The proportion of porogen used for the synthesis of monodisperse macroporous anion exchangers based on poly (meth)acrylamide is 1 to 50% by weight, preferably 3 to 30% by weight, particularly preferably 4 to 20% by weight, based on the monomer.

The terms microporous or gel-type or macroporous have been described in detail in the specialist literature, for example in Seidl, Malinsky, Dusek, Heitz, adv. Polymer Sci., Vol. 5 pages 113 to 213 (1967).

Preferred bead polymers in the context of the present invention have a monodisperse gel-type structure.

The optionally microencapsulated monomer droplet can, if appropriate, also comprise up to 30% by weight (based on the monomer) of crosslinked or uncrosslinked polymer. Preferred polymers are derived from the said monomers, particularly preferably from styrene.

The mean particle size of the optionally encapsulated monomer droplets is 10-1000 µm, preferably 100-1000 µm. The inventive process is also very suitable for the preparation of monodisperse bead-type polymers.

In process step a), the preferably aqueous phase may optionally comprise a dissolved polymerization inhibitor. Suitable inhibitors in the context of the present invention are both inorganic and organic substances. Examples of inorganic inhibitors are nitrogen compounds, such as hydroxylamine, hydrazine, sodium nitrite and potassium nitrite, salts of phosphorous acid, such as sodium hydrogen phosphite and sulphur compounds, such as sodium dithionate, sodium thiosulphate, sodium sulphite, sodium bisulphite, sodium rhodanide or ammonium rhodanide. Examples of organic inhibitors are phenolic compounds, such as hydroquinone, hydroquinone monomethyl ether, resorcinol, catechol, tert-butylcatechol, pyrogallol or condensation products of phenols with aldehydes. Other suitable organic inhibitors are nitrogen compounds. These include hydroxylamine derivatives, for example N,N-diethylhydroxylamine, N-isopropylhydroxylamine and sulphonated or carboxylated N-alkylhydroxylamine derivatives or N,N-dialkylhydroxylamine derivatives, hydrazine derivatives, for example N,N-hydrazinodiacetic acid, nitroso compounds, for example N-nitrosophenylhydroxylamine, N-nitrosophenylhydroxylamine ammonium salt or N-nitrosophenylhydroxylamine aluminium salt. The concentration of the inhibitor is 5 to 1000 ppm (based on the aqueous phase), preferably 10 to 500 ppm, particularly preferably 10 to 250 ppm.

The optionally microencapsulated monomer droplets are polymerized in process step a), as mentioned above, optionally in the presence of one or more protecting colloids in the aqueous phase to give the monodisperse acrylic polymer beads. Suitable protecting colloids are natural or synthetic water-soluble polymers, for example gelatin, starch, polyvinyl alcohol, polyvinyl pyrrolidone, polyacrylic acid, polymethacrylic acid, or copolymers of (meth)acrylic acid and (meth)acrylic esters. Very highly suitable protecting colloids are also cellulose derivatives, in particular cellulose esters and cellulose ethers, such as carboxymethyl cellulose, methyl hydroxyethyl cellulose, methyl hydroxypropyl cellulose and hydroxyethyl cellulose. Gelatin is particularly highly suitable. The amount of protecting colloid used is generally 0.05 to 1% by weight, based on the aqueous phase, preferably 0.05 to 0.5% by weight.

The polymerization to give the monodisperse crosslinked acrylic polymer beads as starting material for process step b) can optionally also be carried out in the presence of a buffer system. Preference is given to buffer systems which set the pH of the aqueous phase at the start of polymerization to between 14 and 6, preferably between 13 and 8. Under these conditions protecting colloids containing carboxylic acid groups are present wholly or partly as salts. In this manner the action of the protecting colloids is favorably influenced. Particularly highly suitable buffer systems comprise phosphate salts or borate salts. The terms phosphate and borate in the context of the invention also include the condensation products of ortho forms of corresponding acids and salts. The concentration of phosphate or borate in the aqueous phase is 0.5 to 500 mmol/l, preferably 2.5 to 100 mmol/l.

The stirrer speed in the polymerization to form the monodisperse crosslinked acrylic polymer is less critical and, in contrast to the conventional bead polymerization, has no effect on the particle size. Low stirrer speeds are employed which are sufficient to keep the suspended monomer droplets in suspension and to support the removal of the heat of polymerization. For this task, various stirrer types can be used. Particularly suitable types are gate stirrers having an axial action.

The volumetric ratio of encapsulated monomer droplets to aqueous phase is 1:0.75 to 1:20, preferably 1:1 to 1:6.

The polymerization temperature depends on the decomposition temperature of the initiator used, and is generally between 50 and 180° C., preferably between 55 and 130° C. The polymerization takes from about $V_2$ hour to several hours. It has proven useful to employ a temperature program in which the polymerization is started at low temperature, for example 60° C., and the reaction temperature is increased with advancing degree of polymerization. In this manner, the demand for a safe reaction course and a high degree of polymerization may be fulfilled very well, for example. After polymerization the polymer is isolated by conventional methods, for example by filtration or decanting, and, if appropriate, washed.

The monodisperse acrylic polymer to be used for the amination in process step b) can be prepared as described above in a plurality of individual steps. Seed polymer based on styrene-divinylbenzene, prepared according to U.S. Pat. No. 4,427,794, is fed, for example with a mixture of methyl acrylate, diethylene glycol divinyl ether and dibenzoyl peroxide, polymerized, washed and dried (Preparation of copolymer I).

The dried copolymer I is fed with further monomer mixture methyl acrylate, diethylene glycol divinyl ether and dibenzoyl peroxide, polymerized, washed and dried (Preparation of copolymer II).

Copolymer II is then, according to the invention, aminated in process step b) and optionally quaternized in a process step c).

In process step b), the monodisperse crosslinked acrylic polymer from process step a) is reacted with amines, preferably in the absence of water. In this case, the amines are not only reactant, but also constitute the stirring medium. However, if appropriate, the stirring medium used for aminolysis can instead be inert liquids such as alkanes, for example alkanes which are liquid in the range from 120° to 250° C.

Amines of the diamine-type are those having at least two amino groups.

Suitable amines in the context of the present invention are compounds with at least two amino groups in the molecule such as, for example, 1-amino-3-dimethylaminopropane, triethylenetetramine, diethylenetriamine, tetraethylenepentamine, pentaethylenehexamine.

The amines are used in excess, based on the groups to be aminolysed; preferably in amounts of 1.1-8 mol, in particular 2 to 6 mol, of amine per mole of ester or nitrile groups.

According to the inventive process, the temperature of the suspension in process step b) is raised to above 100° C., preferably 120° C. to 210° C., particularly preferably 160° C. to 210° C., in particular preferably 170° C. to 200° C.

The suspension in process step b) is stirred according to the invention for a plurality of hours, preferably 10 to 30 hours, particularly preferably 16 to 25 hours.

The aminated bead polymer produced according to the inventive process in process step b) is washed amine-free, preferably until the amine content is less than 0.01% by weight.

The aminated bead polymer obtainable by the inventive process is optionally, in an additional process step, partially or completely alkylated to give strongly basic mono-disperse anion exchangers containing quaternary groups of the poly(methacryl)amide type.

Partially or completely in the context of the present invention means that, in the amination, approximately 10-98% of the basic groups, preferably 35-98% of the basic groups are present as quaternary amino groups.

The alkylating agent used in the context of the present invention for process step c) is preferably chloromethane or benzyl chloride or a mixture of chloromethane and benzyl chloride.

The alkylating agents are generally used in amounts of 10 to 100 mol %, based on the amount of weakly basic groups, these being added to an aqueous suspension of the aminated bead polymer from process step b).

The present invention, however, also relates to the weakly basic monodisperse anion exchangers of the poly(meth)acrylamide type themselves obtainable by a process comprising the following steps:

a) injecting or spraying a monomer mixture of one or more different acrylic compounds and one or more different crosslinkers or one or more monovinyl aromatic compounds and one or more crosslinkers into a liquid which is essentially immiscible with the monomer mixture, to form droplets, encapsulating and polymerizing said droplets and then reacting them with a feed of acrylic compounds and crosslinkers according to a seed-feed process to produce monodisperse crosslinked acrylic polymer beads or monodisperse crosslinked acryl-containing polymer beads, and b) introducing the product obtained by step a) into a liquid amine of the diamine type, heating the suspension to temperatures above 100° C. and stirring for a several hours, and washing the aminated bead polymer until it is amine-free.

In case that the monomer mixture of step a) contains acrylic compounds, a feed of the same acrylic compounds is preferred.

Alternatively when the process is started from one or more different acrylic compounds and one or more different crosslinkers without using a feed in step a) the present invention however, also relates to the weakly basic monodisperse anion exchangers of the poly(meth)arylamide type themselves obtainable by a process comprising the following steps:

a) injecting or spraying a monomer mixture of one or more different acrylic compounds and one or more different crosslinkers into a liquid which is essentially immiscible with the monomer mixture, to form droplets, encapsulating and polymerizing said droplets and b) introducing the product obtained by step a) into a liquid amine of the diamine type, heating the suspension to temperatures above 100° C. and stirring for a several hours, and washing the aminated bead polymer until it is amine-free.

The present invention, however, also relates to the strongly basic monodisperse anion exchangers of the poly(meth)acrylamide type obtainable by partially or completely reacting the aminated bead polymer obtained from process step b) with alkyl halides or aryl halides to give strongly basic monodisperse anion exchangers containing quaternary amino groups of the poly(meth)acrylamide type.

On account of the particular osmotic and mechanical stability and the high purity not only of the weakly basic but also of the strongly basic monodisperse anion exchangers of the poly(meth)acrylamide type, these are suitable for numerous applications.

The present invention therefore also relates to the use of the inventive monodisperse weakly basic or strongly basic anion exchangers of the poly(meth)acrylamide type for removing anions from aqueous or organic solutions or their vapors, for removing anions from condensates, for removing color particles from aqueous or organic solutions, for decolorizing and desalting glucose solutions, wheys, weak gelatin solutions, fruit juices, fruit wines or sugars, preferably mono- or disaccharides, in particular fructose solutions, cane sugar, beet sugar solution, for example in the sugar industry, in dairies, in the starch industry and in the pharmaceutical industry, for removing organic components from aqueous solutions, for example humic acids from surface water.

In addition, the inventive weakly basic or strongly basic anion exchangers of the poly(meth)acrylamide type can be used for purifying and treating waters in the chemical industry and electronics industry, in particular for producing ultrapure water.

In addition, the inventive weakly basic or strongly basic monodisperse anion exchangers of the poly(meth)acrylamide type can be used in combination with gel-type and/or macroporous cation exchangers for demineralizing aqueous solutions and/or condensates, in particular in the sugar industry.

The present invention therefore also relates to processes for removing anions, preferably anions of strong acids, such as chloride, sulphate, nitrate, from aqueous or organic solutions and their vapors, processes for removing anions, preferably anions of strong acids, such as chloride, sulphate, nitrate, from condensates, processes for removing color particles from aqueous or organic solutions, processes for decolorizing and demineralizing glucose solutions, wheys, weak gelatin solutions, fruit juices, fruit wines or sugars, preferably mono- or disaccharides, in particular cane sugar, fructose solutions or beet sugar solutions, for example in the sugar industry, starch industry or pharmaceutical industry, or in dairies, processes for removing organic components from aqueous solutions, for example humic acids from surface water using the inventive weakly basic or strongly basic monodisperse anion exchangers of the poly(meth)acrylamide type.

The inventive monodisperse weakly basic or strongly basic monodisperse anion exchangers of the poly(meth)acrylamide type can, furthermore, be used finely ground in powder form as strongly basic anion exchangers alone or in mixtures with cation exchangers for filtering and demineralizing waters, for example condensates. Their advantages are the high reaction rate and the excellent filtration efficiency for suspended particles.

EXAMPLE 1

Preparation of a Copolymer I

An aqueous solution of 3.6 g of boric acid and 1.0 g of sodium hydroxide in 1218 g of deionized water is placed in a 4 l glass reactor. To this are added 264.7 g of monodisperse microencapsulated seed polymer containing 99.63% by weight of styrene, 0.3% by weight of divinylbenzene and 0.07% by weight of ethylstyrene. The divinylbenzene used was a conventional commercially-available isomer mixture of 80.6% by weight of divinylbenzene and 19.4% by weight of ethylstyrene. The seed polymer was prepared in accordance with U.S. Pat. No. 4,427,794 and the seed polymer capsule wall consisted of a formaldehyde-cured complex coacervate of gelatin and an acrylamide/acrylic acid copolymer. The mean particle size of the seed polymer was 220 µm and the Ø(90)/Ø(10) value was 1.05. The mixture is stirred at a stirrer speed of 220 rpm. In the course of 30 minutes, a mixture of 605.1 g of methyl acrylate, 30.2 g of diethylene glycol divinyl ether and 3.39 g of dibenzoyl peroxide (75% strength by weight) is added. The polymerization mixture is stirred for 2 hours at room temperature, the gas space being purged with nitrogen. Thereafter a solution of 2.7 g of methyl hydroxyethyl cellulose in 132.3 g of deionized water is added. The batch is heated to 63° C. in the course of 75 minutes and kept at this temperature for 5 hours. The batch is then heated to 95° C. in the course of 60 minutes and stirred for a further 120 minutes at this temperature. The batch, after cooling, is washed with deionized water over a 40 µm screen and is then dried at 80° C. for 18 hours in a drying cabinet. 833 g of a bead-type copolymer I having a mean particle size of 330 µm and a Ø(90)/Ø(10) value of 1.21 are obtained, which means 96 Vol % are in a size range between 297 µm and 363 µm.

Preparation of a Copolymer II as Starting Material for the Inventive Process

An aqueous solution of 1.08 g of boric acid and 0.34 g of sodium hydroxide in 917 g of deionized water is placed in a 4 l glass reactor. To this are added 288.7 g of copolymer I from Example 1a). The mixture is stirred at a stirrer speed of 220 rpm. In the course of 30 minutes a mixture of 439.6 g of methyl acrylate, 21.9 g of diethylene glycol divinyl ether and 2.46 g of dibenzoyl peroxide (75% strength by weight) is added. The mixture is stirred at room temperature for 2 hours, the gas space being purged with nitrogen. Thereafter a solution of 1.83 g of methyl hydroxyethyl cellulose in 89.8 g of deionized water is added. The batch is heated to 60° C. in the course of 75 minutes and kept at this temperature for 5 hours. The batch is then heated to 95° C. in the course of 60 minutes and stirred at this temperature for a further 120 minutes. The batch, after cooling, is washed with deionized water over a 40 µm screen and then dried for 18 hours at 80° C. in a drying cabinet. 667 g of a bead-type copolymer II having a mean particle size of 450 µm and a Ø(90)/Ø(10) value of 1.25 are obtained, which means 95 Vol % are in a size range between 405 µm and 495 µm.

Reaction of the Monodisperse Crosslinked Methyl Acrylate Copolymer I with 1-amino-3-dimethylaminopropane 280 grams of the bead polymer from 1 a) are placed in a 3 liter stirred autoclave at room temperature. 1600 ml of 1-amino-3-dimethylaminopropane are added at room temperature. The suspension is heated to 185° C. in the course of 2.5 hours and stirred for a further 24 hours at this temperature. After cooling to room temperature, the reaction mixture is flushed from the autoclave into a column with isopropanol and eluted with 4 further bed volumes of isopropanol. The resin is then eluted with 8 bed volumes of deionized water.

Yield: 1570 ml

Elemental Composition:
63.4% by weight of carbon
10.0% by weight of hydrogen
15.75% by weight of nitrogen
11.45% by weight of oxygen.

Resin Stability
Original state: 99% perfect beads
After the roller test: 96% perfect beads
After the swelling stability test: 98% perfect beads
Useable capacity of the resin: 0.94 mol/l
Wash water to 10 µS/cm: 7.9 bed volumes
Wash water to 2 µS/cm: 15.9 bed volumes
HCl number of the resin: 1.736 mol/l
NaOH number of the resin: 0.032 mol/l Process Description for Preparing Strongly Basic Monodisperse Anion Exchanger of the poly(meth)acrylamide Type.

Reaction (partial quaternization) of the monodisperse crosslinked dimethylaminopropylamide group-containing bead polymer I from the inventive process with chloromethane.

800 ml of weakly basic resin washed amine-free are introduced into 880 ml of deionized water. The suspension is heated to 40° C. In the course of 1 hour 28.05 grams of chloromethane are added. The mixture is then stirred for a further 6 hours at 40° C.

After cooling the resin is filtered off, washed with deionized water and its volume is determined.

Yield: 940 ml

Resin Stability
Original state: 98% perfect beads
After the roller test: 96% perfect beads
After the swelling stability test: 98% perfect beads
Useable capacity of the resin: 0.94 mol/l
Wash water to 10 µS/cm: 4.8 bed volumes
Wash water to 2 µS/cm: 24.2 bed volumes
HCl number of the resin: 0.74 mol/l
NaCl number of the resin: 0.49 mol/l
NaNO$_3$ number of resin: 0.49 mol/l From this is calculated a degree of quaternization of 39.8%.

Analytical Methods:

Particle Size

Conventional methods, such as screen analysis or image analysis are suitable for determining the median particle size and the particle size distribution. A measure used for the breadth of the particle size distribution is the ratio formed from 90% value (Ø(90)) and the 10% value (Ø(10)) from the volume distribution.

The 90% value (Ø(90)) gives that diameter which is greater than the diameter of 90% of the particles. Correspondingly, the diameter of the 10% value (Ø(10)) exceeds that of 10% of the particles. Particle size distribution of Ø(90)/Ø(10)≦1.5, particularly Ø(90)/Ø(10)<1.25, are preferred.

Determination of the Amounts of Basic and Weakly Acidic Groups 50 ml of exchanger in the as-delivered form are shaken into a 100 ml measuring cylinder on a vibrating table under deionized water and flushed into a filter tube. 500 ml of 2% strength by weight sodium hydroxide solution are added in the course of 50 minutes. The exchanger is then washed with tetrahydrofuran in 100 ml portions. From the second portion, the eluate is collected separately in Erlenmeyer flasks and titrated against phenolphthalein from pink to colorless using 0.1 normal hydrochloric acid. Washing ends when the effluent no longer gives a color with phenolphthalein or only 0.1 ml of 0.1 normal HCl is required to titrate from pink to colorless. Then, in succession, 300 ml of 1 normal HCl and 300 ml of tetrahydrofuran are filtered through each in the course of 30 minutes. The effluent is collected in a 1 liter measuring flask, made up to the mark with deionized water and mixed. 10 ml of solution are diluted in a glass beaker with 50 ml of deionized water and titrated with 0.1 n sodium hydroxide solution to pH 4.3 using a pH electrode. When titration is complete, the pH is adjusted to approximately 3 using 0.1 molar $HNO_3$, the solution is diluted with deionized water to a volume of approximately 100 ml and the chloride is titrated with a silver electrode and $AgNO_3$.

HCl number: the HCl number is an index of the amount of weakly basic groups in the resin dimension: moles of weakly basic groups per liter of resin.

Determination of the HCl Number
300−($AgNO_3$-consumption·10)/50=mol/liter of exchanger in the as-delivered form NaOH number is an index of the amount of weakly acidic groups in the resin dimension: moles weakly acidic groups per liter of resin Determination of the NaOH Number
($AgNO_3$-consumption·10)−(NaOH-consumption·10)
·0.02=mol/liter of exchanger in the as-delivered form Determination of the Amount of Weakly and Strongly Basic Groups 100 ml of anion exchanger are charged in a glass column in the course of 1 hour and 40 minutes with 1000 ml of 2% strength by weight sodium hydroxide solution. The resin is then washed with deionized water to remove the excess of sodium hydroxide solution.

Determination of the NaCl Number 50 ml of the exchanger in the free base form and washed to neutrality are placed in a column and charged with 950 ml of 2.5% strength by weight aqueous sodium chloride solution. The effluent is collected, made up to 1 liter with deionized water and of this 50 ml is titrated with 0.1 n (=0.1 normal) hydrochloric acid. The resin is washed with deionized water.

ml of 0.1 n hydrochloric acid consumed·4/100=NaCl number in mol/l of resin.

Determination of the $NaNO_3$ Number 950 ml of 2.5% strength by weight sodium nitrate solution are then filtered through. The effluent is made up to 1000 ml with deionized water. Of this one aliquot, 10 ml, is taken off and analyzed for its chloride content by titration with mercury nitrate solution.

ml of Hg ($NO_3$) solution consumed·factor/17.75=$NaNO_3$ number in mol/liter of resin.

Determination of the HCl Number

The resin is washed with deionized water and flushed into a glass beaker. 100 ml of 1 n hydrochloric acid are added and the mixture is allowed to stand for 30 minutes.

The entire suspension is flushed into a glass column. A further 100 ml of hydrochloric acid are filtered through the resin. The resin is washed with methanol. The effluent is made up to 1000 ml with deionized water. Of this 50 ml are titrated with 1 n of sodium hydroxide solution.

(20-ml of 1 n sodium hydroxide solution consumed)/5=HCl number in mol/liter of resin.

The amount of strongly basic groups is equal to the sum of $NaNO_3$ number and HCl number.

The amount of weakly basic groups is equal to the HCl number.

Number of Perfect Beads after Preparation 100 beads are viewed under the microscope. The number of beads which are cracked or splintered is determined. The number of perfect beads is given by the difference between the number of damaged beads and 100.

Determination of Resin Stability by the Rolling Test

The bead polymer to be tested is divided between two plastic cloths in a uniform layer thickness. The cloths are placed on a solid horizontally mounted support and subjected to 20 working cycles in a rolling apparatus. One working cycle consists of rolling carried out back and forth. After rolling, the number of undamaged beads is determined by enumeration under the microscope on representative samples (100 beads).

Swelling Stability Test 25 ml of anion exchanger in the chloride form are charged into a column. 4% strength by weight aqueous sodium hydroxide solution, deionized water, 6% strength by weight hydrochloric acid and again deionized water are successively placed into the column, the sodium hydroxide solution and the hydrochloric acid flowing from the top through the resin, and the deionized water being pumped through the resin from the bottom. The treatment is performed in timed cycles via a control apparatus. One working cycle lasts 1 h. 20 working cycles are carried out. After the end of the working cycles, 100 beads are counted from the resin sample. The number of perfect beads which are not damaged by cracks or splitters is determined.

Useable Capacity of Strongly Basic and Medium Strongly Basic Anion Exchangers and Determination of the Amount of Wash Water 1000 ml of anion exchanger in the chloride form, that is to say the nitrogen atom bears chloride as counter ion, are charged into a glass column. 2500 ml of 4% strength by weight sodium hydroxide solution are filtered through the resin in 1 hour. The resin is then washed with 2 liters of debased, that is to say decationized, water. The amount of wash water which is required until the eluate has a conductivity of 10 μS/cm or 2 μS/cm is reported in bed volumes per liter of resin. Water having a total anion hardness of 25 degrees German hardness is then filtered through the resin at a rate of 10 liters per hour. In the eluate, the hardness and the residual amount of salicylic acid are analyzed. Charging is ended at a residual salicylic acid content of ≧0.1 mg/l.

From the amount of water which is filtered through the resin, the total anion hardness of the water filtered through and the amount of packed resin, the number of grams of CaO that are taken up per liter of resin is determined. The number of grams of CaO is the utilizable capacity of the resin in the units grams of CaO per liter of anion exchanger.

It should be understood that the preceding is merely a detailed description of a few embodiments of this invention and that numerous changes to the disclosed embodiments can be made in accordance with the disclosure herein without departing from the spirit or scope of the invention. The preceding description, therefore, is not meant to limit the scope of the invention. Rather, the scope of the invention is to be determined only by the appended claims and their equivalents.

We claim:

1. Process for producing monodisperse strongly basic anion exchangers of the poly(meth)acrylamide type containing quaternary amine groups, wherein
   a) in a first stage a monomer mixture of
      one or more different acrylic compounds and one or more different crosslinkers or
      one or more different monovinyl aromatic compounds and one or more different crosslinkers
      are injected or sprayed into a liquid essentially immiscible with the monomer mixture to form droplets, the droplets are then encapsulated and polymerized, and the encapsulated and polymerized droplets are then reacted with a feed of acrylic compounds and crosslinkers in a seed-feed process and the resulting product is polymerized to form monodisperse crosslinked acrylic polymer beads or monodisperse crosslinked acryl-containing polymer beads,
      and
   b) the product obtained by step a) is then introduced into a liquid amine of the diamine type to form a suspension, the suspension is heated to temperatures above 100° C., optionally distilled, stirred for several hours, and the resulting aminated bead polymer is washed amine-free,
      and is reacted with alkylhalides or aryhalides.

2. Process for producing monodisperse strongly basic anion exchangers of the poly(meth)acrylamide type according to claim 1 wherein
   a) in a first stage a monomer mixture of
      one or more different acrylic compounds and one or more different crosslinkers is injected or sprayed into a liquid essentially immiscible with the monomer mixture to form droplets, the
      droplets are then encapsulated and polymerized, and the encapsulated and the polymerized droplets are then reacted according to step b).

3. Process according to claim 1, wherein the monodisperse crosslinked acrylic polymer beads or monodisperse crosslinked acryl-containing polymer beads in process step a) are produced by a combination of spraying (jetting), encapsulation and polymerization.

4. Process according to claim 1, wherein said polymerization of said encapsulated droplets is partial polymerization or a complete polymerization.

5. Process according to claim 1, wherein the droplets are microencapsulated with a complex coacervate.

6. Process according to claim 5, wherein the droplets are microenclapsulated in the presence of a protecting colloid.

7. Process according to claim 1, wherein the polymerization of the encapsulated droplets is carried out in the presence of at least one initiator.

8. Process according to claim 1, wherein the monomer mixture further comprises porogens and the droplets, after polymerization, form macroporous crosslinked bead polymers.

9. Process according to claim 1, wherein said liquid essentially immiscible with the monomer mixture is water.

10. Process according to claim 6, wherein said protecting colloid is selected from the group consisting of gelatin, starch, polyvinylalcohal, polyvinylpyrrolidone, polyacrylic acid, polymethacrylic acid, copolymers of (meth)acrylic acid and copolymers of (meth)acrylic esters.

11. Process according to claim 1, wherein said crosslinkers are selected from the group consisting of divinyibenzene, divinyitoluene, trivinylbenzene, divinylnaphthalene, trivinylnaphlhalene, 1,7-octadiene, 1,5-hexadiene, ethylene glycol dimethacrylate, trimethylolpropane trimethacrylate, allyl methacrylate and diethylene glycol divinyl ether.

12. Process according to claim 7, wherein the initiator is a peroxy compound or an azo compound.

13. Process according to claim 12, wherein said peroxy compound is a member of the group consisting of dibenzoyl peroxide, dilauroyl peroxide, bis(p-chlorobenzoyl) peroxide, dicyclohexyl peroxydicarbonate, tert-butyl peroctoate, tert-butyl peroxy-2-ethylhexenoate, 2,5-bis(2-ethy-hexanoylperoxy)-2,5-dimethylhexane and tert-amylperoxy-2-ethylhexane, and said azo compound is a member of the group consisting of 2,2'-azobis(isobutyronitrile) and 2,2'-azobis(2-methylisobutyronitrile).

14. Process according to claim 1, wherein said liquid amine of the diamine type is selected from the group consisting of 1-amino-3-dimethylaminopropane, diethylenetriamine and triethylenetetramine.

15. Process of claim 1, wherein said alkylhalides or aryihalides are selected from the group consisting of chloromethane, benzyl chloride or mixtures of chloromethane and benzyl chloride.

16. Process according to claim 1, wherein in process step a) the monovinyl aromatic compound is styrene and the crosslinker is divinylbenzene.

17. The process of claim 1, wherein said temperature is 160° C. to 200° C.

18. The process of claim 2, wherein said temperature is 160° C. to 200° C.

* * * * *